Sept. 27, 1966 P. T. BRADY 3,275,759

BREAK-IN ARRANGEMENT WITH COMPENSATION FOR VARIATIONS IN THE TRANS-HYBRID LOSS FOR ECHO SUPPRESSORS

Filed April 15, 1963

INVENTOR
P. T. BRADY
BY Roy M. Porter Jr.
ATTORNEY

United States Patent Office 3,275,759 Patented Sept. 27, 1966

3,275,759

BREAK-IN ARRANGEMENT WITH COMPENSATION FOR VARIATIONS IN THE TRANS-HYBRID LOSS FOR ECHO SUPPRESSORS

Paul T. Brady, Summit, N.J., assignor to Bell Telephone Laboratories, Incorporated, New York, N.Y., a corporation of New York Filed Apr. 15, 1963, Ser. No. 273,199
6 Claims. (Cl. 179—170.6)

Figure 1:
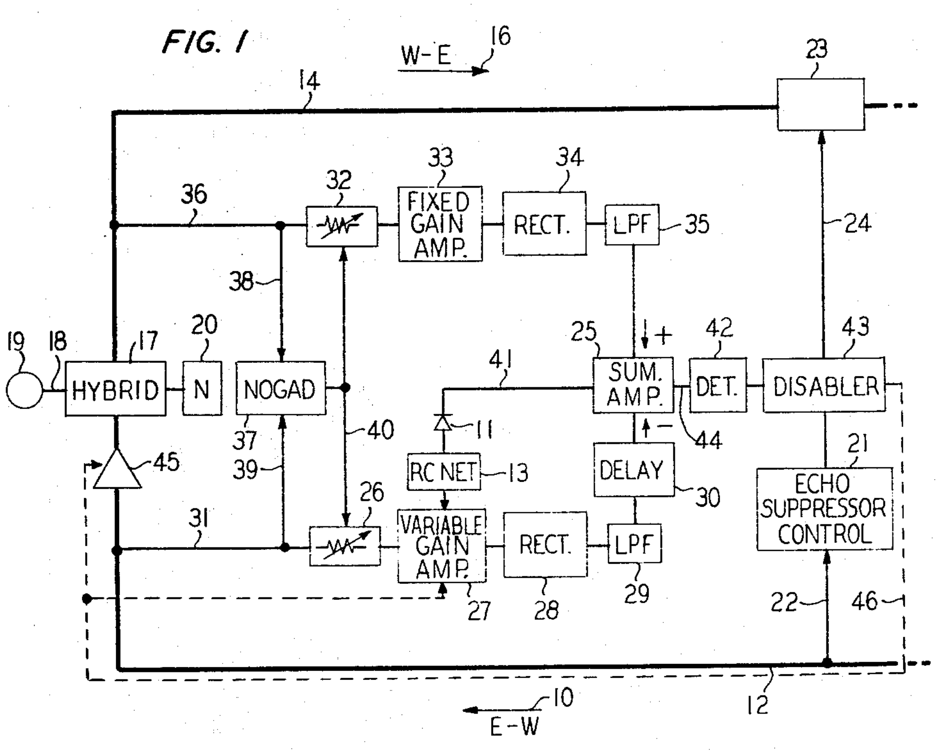

This invention relates to echo suppressors and more particularly to improvements in the break-in arrangement incorporated in echo suppressors.

Echo suppressors effectively eliminate most of the annoying echoes inherent in two-wire to four-wire communication systems. However, another problem arises by their use. Since the transmitting path of the second subscriber is disabled while the first subscriber is speaking, it is quite obvious that the interrupting party must wait until the first talker has ceased speaking before he will be able to transmit his information. To compound this problem even further, if both subscribers begin speaking at approximately the same moment, each subscriber will attempt to cause operation of the echo suppressor associated with the opposite subscriber and, at best, the speech will be transmitted as chopped bursts.

To prevent the problem noted above from arising and to facilitate two-way transmission various so-called break-in arrangements have been utilized to disable the echo suppressor when both parties are talking. The break-in system gaining the widest use is the "amplitude" or "differential" arrangement. This system compares the levels of signals existing in the paths of the four-wire portion of the transmission system (usually by means of a differential amplifier) and produces an output whose polarity (with respect to a reference such as ground) and amplitude is representative of the difference in the levels. To construct such a system the echo transmission loss (i.e., the amount of attenuation the received signal receives before it is applied to the break-in arrangement as an echo) is assumed and the sensitivity of the break-in system is adjusted so the output of the differential device will be a null when the echo transmission loss is equal to the assumed value. If the local talker is speaking, the signals in the transmitting path of the four-wire link will usually be greater than the assumed echo and in these instances the break-in equipment will produce an output which will cause the echo suppressor to be disabled.

However, there is a major error inherent in the fabrication of the above-described type of break-in arrangement; the echo transmission loss is not constant but is subject to variations. One reason for such variations is that the transmission line is frequency selective and, therefore, the diverse frequencies in the speech spectrum will receive different amounts of attenuation as the signal propagates down the local line and the echo is reflected back. Another factor which adds to such variations is that the transmission line itself cannot remain perfectly balanced since natural weather conditions such as rain or snow or changes in the humidity will affect its characteristics and the same frequency may receive varying amounts of attenuation within any given period depending upon the degree of unbalance of the transmission line. Thus, it has been found in practice that the echo signal will vary in amplitude albeit the received signal may have a constant amplitude.

It becomes obvious that the above-described break-in system may produce deleterious effects in two-way transmission of speech signals. Viz, if the break-in system is designed to produce a null at the output of the differential amplifier when the echo transmission loss is maximum—any decrease in the loss will increase the echo amplitude thereby causing the echo suppressor to be disabled and echoes will be transmitted unattenuated. If the break-in system is designed to produce a null at the output of the differential amplifier when the echo transmission loss is a minimum—any improvement in the loss will decrease the echo amplitude thereby requiring the interrupting party to talk at an increased volume level to compensate for the differential to disable the echo suppressor. If this party is a "weak speaker" he may never get control of the echo suppressor. If the break-in system is designed to produce a null at the differential amplifier output at some point between the maximum and minimum echo transmission loss—both of the aforementioned faults may occur.

The primary object of the present invention is to provide a break-in arrangement for use in an echo suppressor which automatically compensates for variations in the echo transmission loss.

Another object of the present invention is to provide an amplitude-type break-in arrangement which performs the above-noted objective with a minimum of circuit elements and in a highly reliable manner.

Accordingly, the preferred embodiment of the present invention comprises an amplitude-type break-in arrangement wherein a variable gain amplifier, which is sensitive to control signals of one direction or polarity with respect to a reference, is connected between the receiving path and one input to a summing amplifier. The summing amplifier is connected to receive a portion of the signals in the transmitting and receiving paths and to produce an output whose polarity and amplitude is representative of the difference between the greater and smaller signals. The gain of the variable gain amplifier is controlled by the output of the summing amplifier and the maximum gain is chosen so a null (which is equal to the chosen reference) will appear at the output of the summing amplifier when the echo transmission loss is a minimum. Changes in the echo transmission loss will cause the output of the summing amplifier to make excursions in one direction (with respect to the null) thereby changing the gain of the variable gain amplifier until the null reappears. When the local speaker begins to talk the output of the summing amplifier will make excursions in the opposite direction to thereby disable the suppressor.

Since the echo signal may be distorted relative to the received signal, it has not proved feasible to compare the instantaneous amplitude of these signals.

Accordingly, it is a further object of this invention to examine the syllabic waveform energy content of the speech patterns to thereby improve the accuracy of detection of conditions of double-talking.

Figure 2:
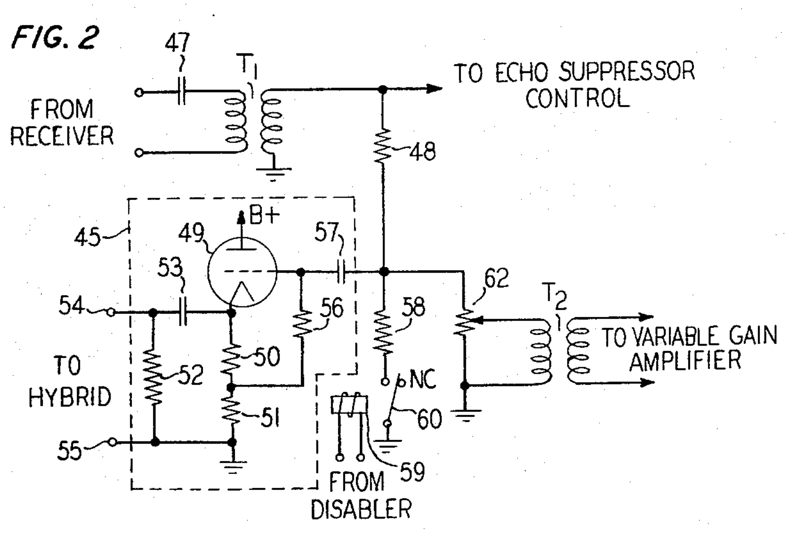

The above and other features of this invention will be more clearly understood from the consideration of the following detailed description taken in conjunction with the drawings wherein:

FIG. 1 is a schematic diagram in block form of an echo suppressor and break-in arrangement constructed in accordance with the present invention; and FIG. 2 is a schematic circuit diagram showing how portions of FIG. 1 may be implemented.

It is to be understood that the single interconnected transmission lines depicted in FIG. 1 are two leads. It is further to be noted that the break-in arrangement will be described in conjunction with a split-terminal echo suppressor albeit the suppressor for only one terminal will be disclosed since the arrangement associated with the other terminal will be identical. However, the invention is not to be thought of as being limited to this particular type of echo suppressor system. Like numbers in the different figures indicate the same elements.

In accordance with the present invention, FIG. 1 shows the echo suppressor which is associated with the west, or near-end terminal of the two-wire to four-wire transmission system. The signals transmitted from the east or far-end terminal, and therefore traveling from east to west as indicated by arrow 10, enter the western terminal by a receiving path 12. Signals traveling from the western terminal by a transmitting path 14 will be propagated in the direction indicated by arrow 16 toward the eastern terminal. Receiving path 12 terminates in a hybrid coil 17 through an isolation, or one-way, amplifier 45. Transmitting path 14 originates in hybrid 17. The hybrid coil couples the local two-wire subscriber line 18 to paths 12 and 14. A subscriber's handset 19 terminates one end of line 18 and a balancing network 20 terminates the other end of line 18, through the hybrid coil 17.

An echo suppressor control 21 is connected to path 12 by a lead 22. An attenuating device 23 is serially connected in path 14 and is controlled by the signals appearing on a lead 24 which interconnects control 21 and device 23 through a disabler 43. Device 23 may comprise any type of device which will cause the signals in path 14 to be attenuated once the device has been operated, such as a relay which will place a short circuit across the path or a variolosser of known construction.

Receiving path 12 is connected to one input terminal of a summing amplifier 25 through the series circuit comprising attenuator 26, variable gain amplifier 27, rectifier 28, low-pass filter 29, and a delay device 30 by a lead 31. Transmitting path 14 is connected to the other input terminal of summing amplifier 25 through the series circuit comprising attenuator 32, fixed gain amplifier 33, rectifier 34, and a low-pass filter 35 by a lead 36. One output terminal of amplifier 25 is connected, through a diode 11 and an RC network 13, to amplifier 27 by a lead 41. The other output terminal of amplifier 25 is connected to echo suppressor disabler 43 through a threshold detector 42 by a lead 44.

The attenuation introduced by devices 26 and 32 are governed by a nogad (noise operated gain adjusting device) 37 (a device which is well known in the art) which is respectively connected to leads 36 and 31 by the leads 38 and 39. The nogad operates in the conventional manner to desensitize the break-in arrangement to noise signals by regulating the attenuation of 26 and 32 through an interconnecting lead 40 in response to the noise level existing in the transmitting and receiving paths.

Low-pass filters 29 and 35 are included in the system to minimize the effects of distortion of the echo signal thereby improving the operation of the break-in arrangement. Thus, slowly varying syllabic energy only is applied as an input to amplifier 25 rather than the instantaneous amplitudes of the speech signals. The reason for this scheme is that the effects of an unbalance of the local line 18 on the echo signal is not as great at low syllabic energy frequencies as it is at voice frequencies.

Rectifier 28 rectifies a portion of the signals appearing in receiving path 12 and produces a signal of one polarity with respect to a reference. In this embodiment, it will be assumed that the reference is ground and rectifier 28 produces a negative going signal. Rectifier 34 rectifies a portion of the signals appearing in transmitting path 14 and produces a positive going signal with respect to the aforementioned reference. The summing amplifier 25 will produce an output signal whose polarity and amplitude is directly related to the differential between the levels of the input signals, i.e., if the signal on lead 36 is the larger, a positive signal will appear at the output terminals of amplifier 25; if the signal on lead 31 is the larger, a negative signal will appear at the output terminals of amplifier 25.

The gain of amplifier 27 is controlled by the level of the signals appearing on lead 41. The anode of diode 11 is connected to amplifier 27 through network 13 and the cathode of diode 11 is connected to the output terminal of amplifier 25, thereby preventing positive signals with respect to ground from reaching amplifier 27. RC network 13, which may comprise a resistor serially connected in lead 41 and a capacitor connected between the lower terminal of the resistor and ground, is utilized to smooth out the control signals on lead 41 so the gain of amplifier 27 will change slowly. Furthermore, as will become apparent from the discussion of the operation of the system below, the maximum gain of the amplifier is chosen to make the output of amplifier 25 equal to the reference point (ground) when the echo transmission loss is a minimum.

The operation of the system will now be discussed for two cases: in the first case only the distant speaker is talking; in the second case both speakers are talking.

When the distant speaker is talking, a portion of the signals appearing in receiving path 12 will be impressed upon control 21 which, in turn, will cause device 23 to insert attenuation in transmitting path 14. The same signals will propagate down path 12 and through isolation amplifier 45, hybrid coil 17 and local line 18 to be received at the subset 19. A portion of these signals will appear at lead 31 and be attenuated by 26, amplified by amplifier 27, rectified by rectifier 28 and appear as a negative going signal at the input terminal of amplifier 25 after being filtered by filter 29 and delayed by delay 30. Delay 30 is included in the circuit to compensate for end-delay in the local line 18. That is, the echo signal will be delayed as it propagates down line 18 and is reflected back to hybrid 17 before reaching the other input terminal of amplifier 25. To attempt to make the original signal and the echo signal coincide in time, the original signal may be delayed by an interval equal to half of the maximum expected delay an echo appearing at 36 would receive, or some similar value.

The echo appearing in transmitting path 14 will be impressed upon lead 36 and be applied to the other input terminal of amplifier 25 after being attenuated by 32, amplified by amplifier 33, rectified by rectifier 34 and filtered by low-pass filter 35. As noted hereinabove, the maximum gain of amplifier 27 is chosen so that for the worst case of echo transmission loss the output of the summing amplifier will be at the reference potential. Diode 11 is included in the circuit so that amplifier 27 is responsive to signals of one polarity only. If the echo transmission loss is greater than its minimum expected value, the amplitude of the echo signal will be lower than its maximum expected value. This will result in a negative signal appearing at the output of amplifier 25. This signal will be applied to amplifier 27 by lead 41 to thereupon adjust the gain of amplifier 27 until the output of amplifier 25 returns to the reference level. If, on the other hand, the echo transmission loss was at a low value, the amplitude of the echo signal would be large. This will result in a positive signal appearing at the output of amplifier 25. The gain of amplifier 27 will immediately begin to rise to the maximum value, but not higher, because diode 11 prevents positive signals from being applied to amplifier 27. However, once the gain of amplifier 27 passes the point wherein the input signals to amplifier 25 would produce a null at the output terminals thereof, the gain will remain constant unless the echo transmission loss again changed (i.e., once the gain exceeded that value required to produce a null at the output of 25, a negative signal would appear at the output of 25 to readjust the gain of 27 in the manner described above).

For the second case it is assumed the local talker begins to speak at the same time the distant talker is speaking. The signals appearing at the terminal of amplifier 25 which is connected to lead 36 will become larger than the signal appearing at the other input terminal of amplifier 25. This will cause a positive going signal to appear at the output of the summing amplifier. As noted hereinabove, the maximum gain of amplifier 27 is chosen to produce a null at the output of amplifier 25 for the case wherein the echo signal is largest. Thus, amplifier 27 cannot compensate for signals which are larger than the largest echo signal expected and, therefore, cannot bring the output of amplifier 25 back to the reference potential when the signals appearing on lead 36 are larger than the largest echo signal. When the positive signal appearing on lead 44 is above a predetermined threshold as determined by detector 42, disabler 43 will be operated. Disabling device 43 will disconnect control 21 from attenuator 23 thereby allowing signals in path 14 to be transmitted to the eastern terminal unattenuated. Hence, it is seen that variations in the echo transmission loss are automatically compensated for in the break-in arrangement of the present invention.

In many cases it is desirable to insert additional attenuation in receiving path 12 during the time the echo suppressor is disabled. The received signals are thereby attenuated somewhat resulting in a decrease in the amplitude of any echo which may be retransmitted to the distant speaker. Thus, the present invention contemplates a further refinement in the echo suppressor arrangement by including additional attenuation in receiving path 12 during periods of double talking. A control from disabler 43 to amplifier 45 and amplifier 27 is shown by a dashed lead 46. Upon actuation of disabler 43 lead 46 will be energized to insert an attenuation of approximately 6 db in amplifier 45. To compensate for this additional attenuation in receiving path 12, a like amount of attenuation is introduced in amplifier 27. This result may be accomplished by a circuit such as shown in FIG. 2.

Incoming signals from the receiver (not shown) are coupled to the receiving path 12 by transformer $T_1$. A capacitor 47 is connected in series with the primary winding of transformer $T_1$ to prevent the passage of D.C. current. The secondary winding of transformer $T_1$ is connected to echo suppressor control 21 and, through a resistor 48, to isolation amplifier 45. Isolation amplifier 45 may comprise the triode 49 connected in cathode follower arrangement. Thus, the plate of triode 49 is connected directly to B+. The cathode is connected to ground through the resistors 50 and 51. Another resistor 52 is connected in parallel with resistors 50 and 51 and a blocking capacitor 53 is connected between that terminal of resistor 50 which is connected to the cathode of 49 and resistor 52. Output terminals 54 and 55 are connected to hybrid 17. A biasing resistor 56 connects the grid of triode 49 to the junction of resistors 50 and 51. A blocking capacitor 57 connects the grid 49 to the lower terminal of resistor 48. A second resistor 58 is connected to the junction of the capacitor and resistor 48. The other terminal of resistor 58 is connected to one terminal of a relay 59. The armature 60 of relay 59 is connected to ground and, in the normal state, the armature will remain connected to the nonconnected terminal marked NC in FIG. 2. Relay 59 will be energized from signals from disabler 43 when disabler 43 is actuated to disable the echo suppressor. Potentiometer 62 is connected between the junction of resistors 48 and 58 and ground and the primary winding of transformer $T_2$ is connected between the variable element of the potentiometer and ground. The secondary winding of transformer $T_2$ is connected to the variable gain amplifier 27. In the embodiment disclosed, resistors 48 and 58 will be equal to one another and resistor 58 will be very very small in comparison to the resistance of potentiometer 62.

When the echo suppressor is operating, signals will pass through transformer $T_1$ to the echo suppressor control 21. The signals will be attenuated by resistor 48 before passing through isolation amplifier 45 and to the variable gain amplifier input transformer $T_2$. However, since resistor 48 is a low value, the attenuation which it introduces will be very small. That is, resistor 48 will be in series with potentiometer 62 and since the value of potentiometer 62 is extremely high compared with resistor 48, practically all of the signal appears across potentiometer 62. When disabler 43 is operated, in the manner described hereinabove, relay 59 will be energized and cause armature 60 to connect the lower terminal of resistor 58 to ground. Resistor 58 will now shunt potentiometer 62 and the effective resistance of this parallel circuit will be the value of resistor 58. Therefore, the signal appearing at the junction of resistors 48 and 58 will now be one-half the value that it was prior to the operation of relay 59. This, in effect, causes a six db loss to be introduced in amplifier 45 and variable gain amplifier 27.

Although one embodiment of the invention has been disclosed, it will be obvious to those skilled in the art that minor modifications may be made and still remain within the scope of this invention. For example, the variable gain amplifier may be placed in either of the leads 31 or 36, and can be operated by either positive or negative going signals.

What is claimed is:

1. In a transmission system including at least two terminals interconnected by transmitting and receiving paths, an echo suppressor connected to said paths at each terminal for inserting attenuation in the transmitting path when signals are received in the receiving path from the other of said terminals, an amplifier connected to each of said paths for producing an amplified replica of the signals thereon, means for comparing the levels of said amplified signal replicas and detecting both the magnitude and the sense of their difference, means operative when the difference is of one sense for varying the gain of at least one of said amplifiers in the direction to equalize said compared signals, and means operative when the difference is of the other sense for disabling said echo suppressor.

2. A circuit as in claim 1 including means operative when said echo suppressor is disabled for inserting attenuation in said receiving path and for reducing the gain of the amplifier connected to said receiving path.

3. A circuit as in claim 1 comprising in addition means for delaying the signals from the receiving path a length of time sufficient to make the compared signals substantially coincident.

4. In a transmission system including at least two terminals interconnected by transmitting and receiving paths, an echo suppressor connected to said paths at each terminal for inserting attenuation in the transmitting path when signals are received in the receiving path from the other of said terminals, an amplifier connected to each of said paths for producing an amplified replica of the signals thereon, rectifying means connected to each of said amplifiers for producing therefrom signals of opposite polarity to each other, means for adding said rectified signals to detect the sense and magnitude of their sum, means operative when the sum is of one sense for varying the gain of at least one of said amplifiers in the direction to reduce the magnitude of said sum, and means operative when the sum is of the other sense for disabling said echco suppressor.

5. In a transmission system including at least two terminals interconnected by transmitting and receiving paths, an echo suppressor connected to said paths at each terminal for inserting attenuation in the transmitting path when signals are received in the receiving path from the other of said terminals, an amplifier connected to each of said paths for producing an amplified replica of the signals thereon, means for comparing the levels of said amplified signal replicas and detecting their difference, means operative when said difference is within a predetermined range for varying the gain of at least one of said amplifiers in the direction to equalize said compared signals, and means operative when said difference is without said predetermined range for disabling said echo suppressor.

6. In a transmission system including at least two terminals interconnected by transmitting and receiving paths and an echo suppressor connected to said paths at each terminal for inserting attenuation in the transmitting path when signals are received in the receiving path from the other of said terminals, a control circuit for said echo suppressor comprising a first series circuit connected to said receiving path comprising an amplifier, a rectifier, filter means for detecting syllabic speech energy signals, and delay means for delaying signals the amount of time required for an echo of the signals in the receiving paths to appear on the transmitting path, a second series circuit connected to said transmitting path comprising an amplifier, a rectifier, and filter means for detecting syllabic speech energy signals, means for comparing the levels of processed signals from said first and second series circuits and detecting both the magnitude and sense of their difference, means operative when the difference is of one sense for varying the gain of at least one of said amplifiers in the direction to equalize said compared signals, and means operative when the difference is of the other sense for disabling said echo suppressor.

References Cited by the Examiner

UNITED STATES PATENTS

| | | | |
|---|---|---|---|
| 2,254,733 | 9/1941 | Dickieson | 179—170.2 |
| 2,257,806 | 10/1941 | Mitchell | 179—170.6 |
| 3,214,526 | 10/1965 | Mitchell | 179—170.6 |

KATHLEEN H. CLAFFY, *Primary Examiner.*

ROBERT H. ROSE, *Examiner.*

H. ZELLER, *Assistant Examiner.*